(12) United States Patent
Guillon et al.

(10) Patent No.: US 6,650,530 B2
(45) Date of Patent: Nov. 18, 2003

(54) MICROCOMPONENT INCLUDING A CAPACITIVE COMPONENT

(75) Inventors: Bertrand Guillon, Limoges (FR); Pierre Blondy, Limoges (FR)

(73) Assignee: Memscap (FR)

( * ) Notice: Subject to any disclaimer, the term of this patent is extended or adjusted under 35 U.S.C. 154(b) by 0 days.

(21) Appl. No.: 09/989,584

(22) Filed: Nov. 20, 2001

(65) Prior Publication Data

US 2002/0109956 A1 Aug. 15, 2002

(30) Foreign Application Priority Data

Nov. 20, 2000 (FR) .............................. 00 14931

(51) Int. Cl.⁷ ................................................ H01G 5/16
(52) U.S. Cl. ........................................ 361/290; 361/278
(58) Field of Search ................................. 361/277, 278, 361/287, 291, 292, 295–297, 298.1, 300, 290

(56) References Cited

U.S. PATENT DOCUMENTS

| | | | | |
|---|---|---|---|---|
| 3,737,805 A | * | 6/1973 | Shimodaira et al. | .... 331/116 R |
| 5,526,172 A | * | 6/1996 | Kanack | ....................... 359/291 |
| 5,696,662 A | * | 12/1997 | Bauhahn | .................. 361/298.1 |
| 5,818,683 A | * | 10/1998 | Fujii | ........................... 361/277 |
| 6,373,682 B1 | * | 4/2002 | Goodwin-Johansson | .... 361/278 |
| 6,441,449 B1 | * | 8/2002 | Xu et al. | ..................... 257/414 |

FOREIGN PATENT DOCUMENTS

JP     09199376     7/1997
JP     10189393     7/1998

OTHER PUBLICATIONS

Darrin J. Young, and Bernhard E. Boser, A Micromachined Variable Capacitor for Monolithic Low–Noise Vcos, Jun. 1996, Hilton Head, pp. 86–89.

J. Jason Yao, Sang Tae Park and Jeffrey DeNatale, High Tuning–Ration Mems–Based Tunable Capacitors for RF Communications Applications, Jun. 1998, Hilton Head, pp. 124–127.

J.R. Gilbert, et al., Two–Phase Actuators: Stable Zipping Devices Without Fabrication of Curved Structures, Jun. 1996, Hilton Head, pp. 98–100.

Charles L. Goldsmith, et al., RF MEMs Variable Capacitors for Tunable Filters, International Journal on RF and Microwave Computer–Aided Engineering, Revised Dec. 30, 1998, pp. 362–374.

* cited by examiner

Primary Examiner—Chau N. Nguyen
Assistant Examiner—Eric Thomas
(74) Attorney, Agent, or Firm—Wall Marjama & Bilinski LLP

(57) ABSTRACT

A microcomponent which includes a capacitive component, of at least two elementary capacitors ($C_1$, $C_2$, $C_3$, $C_4$) which are connected in series. Each elementary capacitor is made up of two plates namely: a plate (10) fixed with respect to the rest of the microcomponent; and a second plate (12), part of which is capable of being displaced with respect to the first fixed plate (10) due to the effect of a control signal, so as to vary the value of the capacitance of the elementary capacitor $C_1$. The control signals for the various elementary capacitors are generated independently so as to vary the overall capacitance of the capacitor by independent variation of the capacitances of each elementary capacitor.

9 Claims, 3 Drawing Sheets

MICROCOMPONENT INCLUDING A CAPACITIVE COMPONENT

TECHNICAL FIELD

The invention relates to the field of microelectronics, and more particularly, to the sector of fabricating microcomponents, especially those intended to be used in radio or microwave applications. More particularly, it relates to microcomponents of the variable capacitance type made using a technology known by the abbreviation MEMS (Micro-Electro-Mechanical-Systems). This technology makes it possible for conducting levels to be displaced one with respect to the others, due to the effect of a force which may be electrostatic, thermal or magnetic in origin.

The invention is therefore aimed at microcomponents produced using this technology, and which have a capacitance value which can vary over much wider ranges than the existing components.

PRIOR ART

It is already known to produce capacitive components integrated into microcomponents, using the aforementioned MEMS technology.

Thus, such microcapacitors may have conducting plates, one facing the other, each forming one plate of the capacitor.

Due to the effect of an electrostatic voltage applied between the plates, it is possible to generate a displacement of one plate with respect to the other, and therefore a variation in the capacitance. Such capacitors, known by the generic term of Varicap MEMS, are for example described in the document "A micromachined variable capacitor for monolithic low noise VCOs", D. J. Young and B. E. Boser, Technical Digest Solid State Sensor and Actuator Workshop, pp. 86–89.

The document "High tuning ratio MEMS-based tunable capacitors for RF communications applications", J. Yao, S. Park, J. DeNatale, Tech. Digest., Solid State Sensor and Actuator Workshop pp. 124–127, 1998 also describes variable capacitors whose plates can be moved one with respect to the other in a direction parallel to the plane of the plates.

The document "Two-phase actuators: stable zipping devices without fabrication of curved structures", J. R. Gilbert, S. D. Senturia, Tech. Digest., Solid State Sensor and Actuator Workshop pp. 98–100, 1996 also describes one of the variable capacitors whose two plates form an angle between each other.

Due to the effect of an external force, the angle between the two plates can be altered, and consequently so too can the capacitance of the capacitor formed by these two plates.

These various solutions all have the major drawback of allowing the value of the capacitance to be varied only over a limited range.

Thus, in certain applications for which it is necessary to vary the value of the capacitance considerably, for example in an oscillating circuit whose tuning frequency it is desired to adjust, such components are considered unsuitable.

A first problem which the invention proposes to solve is that of the small variation in capacitance of capacitors made from MEMS technologies.

Moreover, other types of variable capacitors are known, such as, in particular, those described in document "RF MEMS tunable capacitors for tunable filters", C. L. Goldsmith, A. Malczewski, Z. J. Yao, S. Chen, J. Ehmke, D. Hinzel, International Journal on RF and Microwave Computer-Aided Engineering, 1999, pp. 362–374.

Such a capacitor is made by combining a plurality of elementary capacitors, each one having a predetermined capacitance. These various capacitors are combined by a set of microswitches allowing their parallel placement.

These microswitches are produced in MEMS technology, and are controlled dynamically in order that a certain number of elementary capacitors are placed in parallel.

An overall capacitor of this sort has certain drawbacks. Firstly, the capacitance value of the overall capacitor can only be adjusted to an accuracy corresponding to the capacitance value of the smallest of the elementary capacitors. This adjustment of the capacitance value is therefore not continuous, but discrete.

Furthermore, such a capacitor has a relatively high resistance, since the resistance is equivalent to the resistances of the elementary capacitors produced using traditional technology, increased by that of the microswitches.

Such a resistance is an obstacle to obtaining satisfactory performance, especially in radiofrequency circuits.

A second problem which the invention proposes to solve is that of allowing continuous adjustment of the value of a variable capacitor, as accurately as possible.

SUMMARY OF THE INVENTION

The invention relates to a microcomponent including a capacitive component. This microcomponent is characterized in that the capacitive component consists of at least two elementary capacitors connected in series, each elementary capacitor comprising two plates, namely:

a plate fixed with respect to the rest of the microcomponent;

a second plate, part of which is capable of being displaced with respect to the first fixed plate due to the effect of a control signal, so as to vary the value of the capacitance of the elementary capacitor.

In other words, the overall capacitance of the capacitor, the inverse of which is equal to the sum of the inverses of the capacitance of each elementary capacitor, may be adjusted by varying the capacitance of each elementary capacitor.

In a preferred embodiment, it may be possible to displace the movable plate f an elementary capacitor such that this capacitance is particularly high and therefore relatively negligible in the calculation of the overall capacitance. More specifically, the operating mode may be such that all the capacitances except for one are controlled such that the plates are particularly close, and that the capacitance of each elementary capacitor is extremely high.

In this case, the overall capacitance is substantially equal to that of the single capacitor which is controlled differently.

Thus, when the various elementary capacitors have ranges for varying their capacitance which are different, it is possible to provide the overall capacitor with the desired capacitance by choosing the elementary capacitor whose range covers the desired value, and to control the other elementary capacitors such that their capacitance is very high, therefore, negligible.

By choosing variation ranges with a small overlap, the variation range of the overall capacitance is thus optimized.

The architectures used for the elementary capacitors may in particular be varied. Thus, the movable plates can be displaced with respect to the fixed plate in directions perpendicular or parallel to the main plane of the fixed plate.

In another type of elementary capacitor, it may be possible to displace the second plate with respect to the fixed plate by pivoting it about an axis parallel to the latter.

Several technologies may be employed to produce elementary capacitors, and especially technologies using electrolytic deposition of copper.

In a particular embodiment, the elementary capacitors are produced such that the moveable plate forms an arch straddling the fixed plate, with the arch having a deformable central part capable of moving toward the fixed plate due to the effect of the control signal.

In other words, the movable plate forms a bridge which straddles the track forming a fixed plate. The surfaces facing this bridge and the fixed plate form the elementary capacitor. Because of the flexibility of this bridge, it is possible to vary the distance separating the fixed plate and the bridge, such that the capacitance of this elementary capacitor varies.

The arch can be deformed in different ways, for example by applying a continuous bias voltage between the fixed plate and the movable plate.

In practice, the deformation of the bridge makes it possible to vary the capacitance of the elementary capacitor between a high value and a low value.

In practice, the geometry of each elementary capacitor is such that the ratio of these extreme values of capacitance is greater than two, and preferably than five. Under these conditions, the maximum capacitance is relatively large, and it is negligible enough compared to the capacitances of the other elementary capacitors to have a minimal effect on the calculation of the overall capacitance.

In a preferred embodiment, at least one elementary capacitor has a moveable plate which is capable of coming into contact with th fixed plate, and thus of operating as a switch with a capacitance comparable to infinity, without affecting the other elementary capacitors.

BRIEF DESCRIPTION OF THE FIGURES

The method of producing the invention and the advantages which result therefrom will emerge properly from the description of the embodiment which follows, with the support of the appended figures, in which.

METHOD OF PRODUCING THE INVENTION

As already stated, the invention relates to a microcomponent which includes a capacitor consisting of a plurality of elementary capacitors placed in series, each of these elementary capacitors having a variable capacitance, by virtue of the possibility of varying the distance between their plates.

Figure 1:
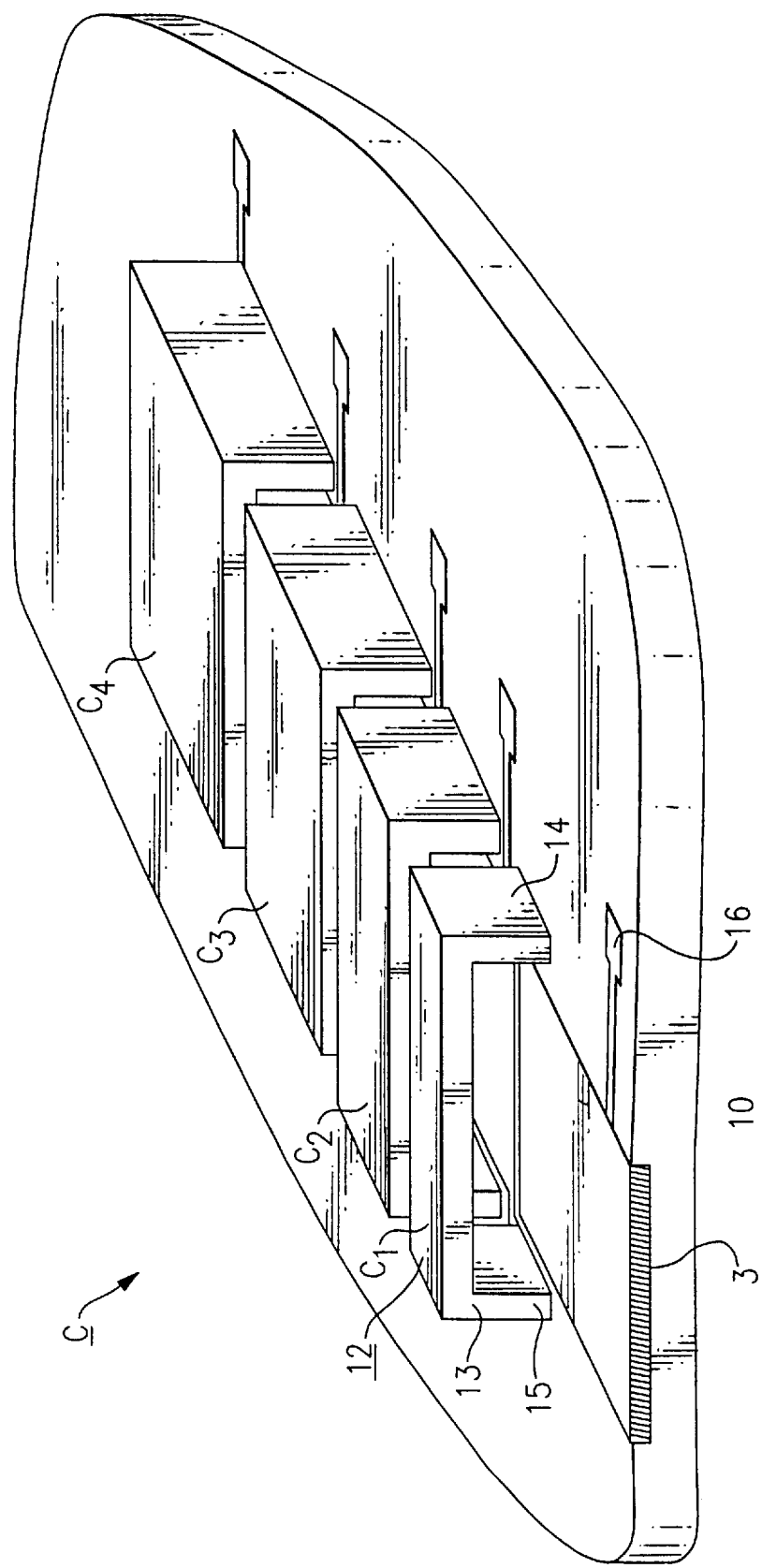
FIG. 1 is a rough perspective view of part of a microcomponent according to the invention, in the region including several elementary capacitors.

More specifically, and as illustrated in the example of FIG. 1, the overall capacitor consists of the series combination of four elementary capacitors $C_1$, $C_2$, $C_3$, $C_4$. It should be understood that the invention also covers the variants including a lower or higher number of elementary capacitors.

As illustrated in FIG. 1, each elementary capacitor $C_1$–$C_4$ has a fixed plate (10), which consists of a metal track inserted into a channel (3) provided to this end in the substrate (2).

This fixed plate (10) can be produced using various processes, and for example a process of electrolytic deposition of copper.

Moreover, each elementary capacitor $C_1$–$C_4$ comprises a movable plate (12) which, in the example of FIG. 1, consists of a bridge straddling the fixed plate (10). More specifically, this movable plate (12) comprises two lateral segments (13, 14) which are perpendicular to the main plane of the substrate (2). These two lateral segments (13, 14) have their low ends (5, 6) inserted inside a channel (7, 8) provided for this purpose in the substrate (2). The movable plate (12) also comprises a central segment (19) connecting the lateral segments (13, 14). This central segment (19) has a face (21) facing the fixed plate (10). These facing regions therefore form the actual elementary capacitor $C_1$.

The value of the capacitance of the capacitor is determined by:

the distance (d) separating the face (21) from the central segment (19) of the movable plate (12) and the fixed plate (10);

the type of materials present between the fixed plate (10) and the movable plate (12);

the surface area of the facing regions on the fixed plate (10) and the movable plate (12).

With regard to the type of material used, this depends on the technology implemented for producing the plates. Thus, the material present between the two plates may be air, or an inert gas, or even air combined with an insulating layer preventing contact between the movable plate (12) and the fixed plate (10).

Figure 2:
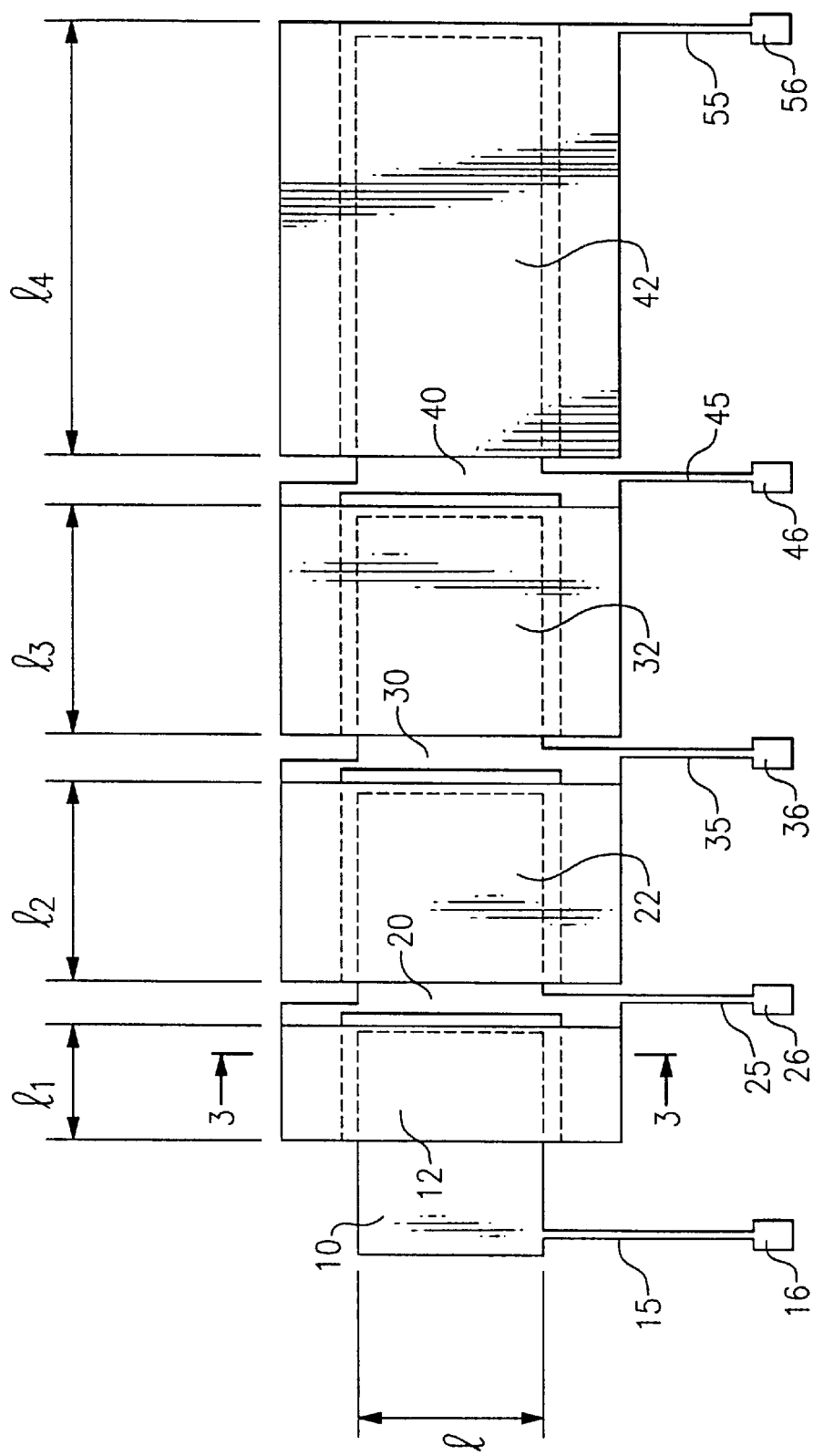
FIG. 2 is a top view of the microcomponent, in its region including several elementary capacitors.
Figure 3:
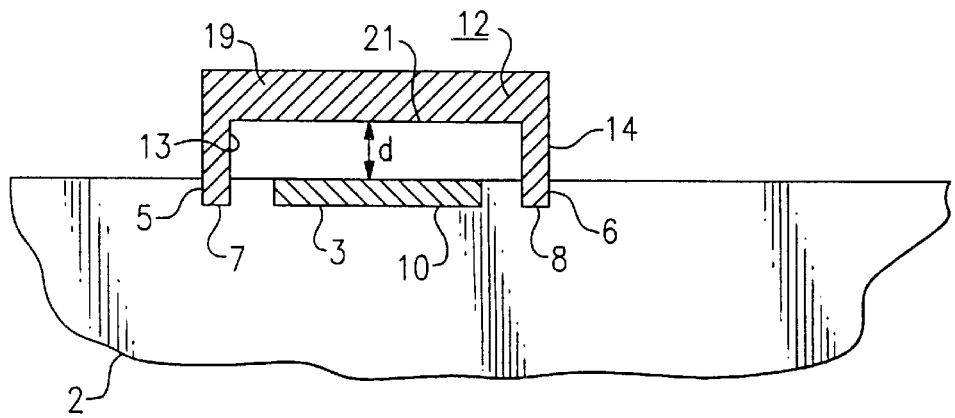
FIG. 3 is a sectional view through the plane III–III' of FIG. 2.

The facing surface area between the two plates corresponds substantially to the products of the width l of the fixed plate (10), by the width $l_1$, $l_2$, $l_3$, $l_4$ of the bridge forming the movable plate (12, 22, 32, 42) of each elementary capacitor. As can be seen in FIG. 2, these widths $l_1$, $l_2$, $l_3$, $l_4$ may vary from one elementary capacitor to the other so that the capacitance values of each of these elementary capacitors are different.

According to the invention, the distance (d) between the fixed plate and the movable plate can be varied on application of a control signal. More specifically, the movable plate (12) is flexible, or has the possibility of deforming such that the central segment (19) of the movable plate (12) may move toward or away from the fixed plate (10).

Several actuation mechanisms may be used, and the invention is not limited to the single embodiment of FIG. 1, in which the displacement of the central segment (19) of the movable plate is obtained by applying a continuous or almost continuous bias voltage between the movable plates (12) and the fixed plates (10).

To this end, the various plates are connected to connection terminals enabling control signals to be applied. More specifically, and as illustrated in FIG. 2, each fixed plate (10, 20, 30, 40) is connected to a transverse track (15, 25, 35, 45) connected to a pad (16, 26, 36, 46) for applying the control signal.

To ensure that the elementary capacitors are placed in series, each movable plate (12, 22, 32, 42) is connected by its two lateral segments (13, 14), to the fixed plate (20, 30, 40) of the adjacent capacitor. Thus, each arch forming the movable plate of an elementary capacitor extends toward the adjacent elementary capacitor thereby forming the fixed plate of the latter. The movable plate (42) of the elementary capacitor $C_4$ forms a terminal for the overall capacitor, and is connected to a pad (56) via a track (55).

As such, applying a continuous voltage between the fixed plate (10, 20, 30, 40) of a capacitor and the fixed plate (20, 30, 40) of the adjacent capacitor, (therefore the movable plate of the capacitor in question), creates an electrostatic field between the movable plate (12) and the fixed plate (10) of an elementary capacitor.

This electrostatic field generates an electrostatic force which, because of the flexibility of the arch (19) of the movable plate (12), causes the deformation thereof. More specifically, the coming together or the moving apart of the central segment (19) of the movable plate (12) toward the fixed plate (10) is observed, according to the sign of the applied voltage.

The capacitance of each elementary capacitor $C_1$ may therefore vary between a minimum value $C_{min}$, corresponding to the maximum separation of the movable plate (12) and the fixed plate (10), and a maximum value $C_M$ for which the movable plate (12) is as close as possible to the fixed plate (10). Between these two values, there is a capacitance value $C_{max}$ corresponding to the limiting value of capacitance that it is desired to reach by controlling the displacement of the arch.

Depending on the technologies used, the materials employed and the geometry of the movable plates, the maximum value $C_M$ may be at least from five to six times the minimum value $C_{min}$. In some technologies, the movable arm (12) may come just into contact with the fixed plate (10), or with the insulating layer which covers it, such that the capacitance reaches a very high value.

Typically, with an elementary capacitor of the following dimensions:
width l of the fixed plate (10) of 420 micrometers;
width $l_1$ of the bridge forming the movable plate from 90 to 200 micrometers;
distance (d) separating the fixed and movable plates from 2 to 6 micrometers; the rest capacitance ($C_{min}$) of the order of 0.1 picofarad is obtained.

This capacitance may be controlled up to a value $C_{MAX}$ of 0.13 picofarad, by applying a suitable bias voltage. The application of a higher voltage causes deformation of the bridge so that the capacitance reaches a value $C_M$ of one picofarad, such that the effect of this microcapacitor in the overall capacitor becomes almost negligible.

Figure 4:
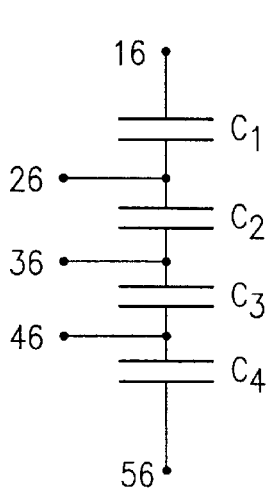
FIG. 4 is a circuit diagram of the structure illustrated in FIG. 2.

FIG. 4 shows a circuit diagram of the configuration illustrated in FIGS. 1 and 2.

The various capacitors $C_1$, $C_2$, $C_3$, $C_4$ have a variable capacitance, over different ranges, typically between a few femtofarads and 1 picofarad.

Figure 5:
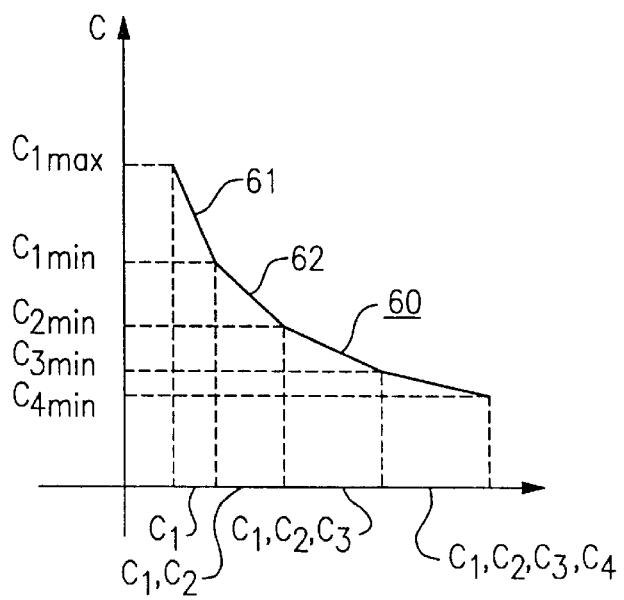
FIG. 5 is a diagram showing the change in the overall capacitance as a function of the various controls of the elementary capacitors.

FIG. 5 illustrates the operation of the invention, by showing the range of capacitance which can be attained by the determination of suitable control signals.

Thus, when the capacitors $C_2$, $C_3$, $C_4$ are controlled such that their movable plate (22, 32, 42) is very close to their fixed plate (20, 30, 40), only the overall capacitor C corresponds substantially to the capacitor $C_1$. The capacitance of the capacitor $C_1$ may be set between two values $C_{1min}$ and $C_{1max}$, corresponding to the positions in which its movable plate is respectively far from or close to the fixed plate.

The capacitance value of the overall capacitor therefore varies over the range illustrated by the segment (61) of the curve (60).

If the capacitor $C_2$ is now actuated in a different way, that is to say if the voltage applied between the terminals (26) and (36) decreases, the elementary capacitor $C_2$ is then completely involved in the overall capacitor. The overall capacitance of this capacitor is therefore:

$$\frac{C_1 \times C_2}{C_1 + C_2}$$

This overall capacitance may then be controlled continuously between two values, the first value being chosen equal to $C_{1min}$, and a second value called $C^{2min}$.

In this way, the overall capacitance can vary between the values $C_{1max}$ and $C_{2min}$, corresponding to the segments 61 and 62 of the curve (60) of FIG. 5.

The approach is generalized for a high number of elementary capacitors, by the suitable actuation of the capacitor $C_3$, then of the capacitor $C_4$.

In practice, a variation in the capacitance of the overall capacitor is thus obtained, measured between the terminals (16) and (56), which is markedly greater than the variation that can be obtained with a single variable capacitor produced in MEMS technology.

Although the invention is described in detail in a system of actuation by a bias voltage and electrostatic forces, it may also covers other variants in which the applied force allowing the moveable plate to move with respect to the fixed plate is obtained by a thermal, magnetic or other phenomenon.

Moreover, the invention is also described using a technology in which the plates are made from a conducting material such as copper, but it also covers variants in which the plates are made from another metal, or even from a semiconducting material.

These microcomponents can be produced in order to form complete capacitors, independently of an integrated circuit. The substrate used may then be either a layer of quartz, silicon or gallium arsenide. The microcomponent may also be produced on a pre-existing integrated circuit.

It emerges from the above that the capacitive microcomponents produced according to the invention have a continuous variation over a very large range, compared with similar microcomponents produced in MEMS technology.

What is claimed is:

1. A microcomponent including a capacitive component, wherein the capacitive component consists of at least three elementary capacitors ($C_1$, $C_2$, $C_3$, $C_4$) connected in series, each elementary capacitor comprising:
   a plate (10) fixed with respect to the rest of the microcomponent;
   a second plate (12), part (19) of which is capable of being displaced with respect to the fixed plate (10) due to the effect of a control signal, so as to vary the value of the capacitance of the elementary capacitor $C_1$;
   wherein the second plate (12) forms an arch straddling the fixed plate (10), said arch having a deformable central part (19) capable of moving toward the fixed plate due to the effect of the control signal,
   and wherein the control signals for the at least three elementary capacitors are generated independently so as to vary the overall capacitance of the capacitor by independent variation of the capacitances of each elementary capacitor.

2. The microcomponent as claimed in claim 1, wherein the second plate (12) of at least one of said elementary capacitors $C_1$ is capable of being displaced with respect to the fixed plate (10) in a direction perpendicular to the main plane of the latter.

3. The microcomponent as claimed in claim 1, wherein the second plate of at least one of said elementary capacitors is capable of being displaced with respect to the fixed plate in a direction parallel to the main plane of the latter.

4. The microcomponent as claimed in claim 1, wherein the second plate of at least one of said elementary capacitors is capable of being displaced with respect to the fixed plate by pivoting it about an axis parallel to the latter.

5. The microcomponent as claimed in claim 1, wherein the control signal is a bias voltage applied between the fixed plate (10) and the second plate (12).

6. The microcomponent as claimed in claim 1, wherein the capacitance of each elementary capacitor varies between two values $C_{MIN}$, $C_M$, wherein the ratio of said two values is greater than two.

7. The microcomponent as claimed in claim 1, wherein the capacitance of each elementary capacitor varies between two values $C_{MIN}$, $C_M$, wherein the ratio of said two values is greater than five.

8. The microcomponent as claimed in claim 1, wherein the elementary capacitors ($C_1$, $C_2$, $C_3$, $C_4$) have ranges of varying capacitance.

9. The microcomponent as claimed in claim 1, wherein for at least one of said elementary capacitors, the movable plate is capable of coming into contact with the fixed plate.

* * * * *